(12) United States Patent
Zhao et al.

(10) Patent No.: US 11,217,860 B2
(45) Date of Patent: Jan. 4, 2022

(54) MODIFIED CERAMIC COMPOSITE SEPARATOR AND MANUFACTURING METHOD THEREOF

(71) Applicant: XIAMEN UNIVERSITY, Xiamen (CN)

(72) Inventors: Jinbao Zhao, Xiamen (CN); Peng Zhang, Xiamen (CN); Chuan Shi, Xiamen (CN); Jianhui Dai, Xiamen (CN)

(73) Assignee: XIAMEN UNIVERSITY, Xiamen (CN)

( * ) Notice: Subject to any disclaimer, the term of this patent is extended or adjusted under 35 U.S.C. 154(b) by 217 days.

(21) Appl. No.: 15/750,083

(22) PCT Filed: Aug. 24, 2016

(86) PCT No.: PCT/CN2016/096502
§ 371 (c)(1),
(2) Date: Feb. 2, 2018

(87) PCT Pub. No.: WO2017/032304
PCT Pub. Date: Mar. 2, 2017

(65) Prior Publication Data
US 2018/0226624 A1 Aug. 9, 2018

(30) Foreign Application Priority Data

Aug. 26, 2015 (CN) .......................... 201510530651.6
Aug. 26, 2015 (CN) .......................... 201510531276.7

(51) Int. Cl.
*H01M 2/16* (2006.01)
*H01M 50/449* (2021.01)
(Continued)

(52) U.S. Cl.
CPC ....... *H01M 50/449* (2021.01); *H01M 50/403* (2021.01); *H01M 50/411* (2021.01); *H01M 50/431* (2021.01); *H01M 10/0525* (2013.01)

(58) Field of Classification Search
CPC ....... H01M 2004/021–026; H01M 10/00–667; H01M 50/40–497
(Continued)

(56) References Cited

U.S. PATENT DOCUMENTS

2012/0107667 A1 5/2012 Jeong et al.
2016/0164060 A1* 6/2016 Zhang ................. H01M 50/431
                                                           429/145
2018/0019457 A1* 1/2018 Alharizah ............... C04B 26/04

FOREIGN PATENT DOCUMENTS

CN  102916149 A  2/2013
CN  103554549 A  2/2014
(Continued)

OTHER PUBLICATIONS

Ryou, M., Lee, Y. M., Park, J., Choi, J. W., Mussel-Inspired Polydopamine-Treated Polyethylene Separators for High-Power Li-Ion Batteries, Advanced Materials, 2011, 23, 3066-3070. (Year: 2011).*

(Continued)

*Primary Examiner* — Bach T Dinh
(74) *Attorney, Agent, or Firm* — Cooper Legal Group, LLC

(57) ABSTRACT

A modified ceramic composite separator includes an organic support layer and a ceramic layer coated on the surface of the support layer in a thickness of 0.1 μm to 20 μm, and further comprises a dopamine or other polymer grown in-situ on the surface and interior of the support layer and the ceramic layer. The inorganic power in the ceramic layer has a particle size of 5 nm to 10 μm, and the material of the organic support layer has a molecular weight of 1000 to 100000000.

8 Claims, 7 Drawing Sheets

(51) Int. Cl.
*H01M 50/403* (2021.01)
*H01M 50/411* (2021.01)
*H01M 50/431* (2021.01)
*H01M 10/0525* (2010.01)

(58) Field of Classification Search
USPC .................................. 429/129–147, 247–255
See application file for complete search history.

(56) References Cited

FOREIGN PATENT DOCUMENTS

| | | | |
|---|---|---|---|
| CN | 10437380 | * | 9/2014 |
| CN | 104659313 A | | 5/2015 |
| CN | 105070868 A | | 11/2015 |
| CN | 105161658 A | | 12/2015 |
| KR | 20120121623 | * | 11/2012 |
| KR | 20130099463 | * | 9/2013 |
| KR | 101378453 | * | 3/2014 |

OTHER PUBLICATIONS

KR20120121623 English translation (Year: 2012).*
KR101378453 English translation (Year: 2014).*
KR20130099463 English translation (Year: 2013).*

* cited by examiner

MODIFIED CERAMIC COMPOSITE SEPARATOR AND MANUFACTURING METHOD THEREOF

FIELD OF THE INVENTION

The present invention relates to the technical field of lithium-ion batteries, and especially to a modified ceramic composite separator film and application thereof.

BACKGROUND OF THE INVENTION

As a kind of chemical power system with high power density, high output voltage, no memory effect, excellent cycling performance and environment-friendliness, lithium-ion battery has good economic benefits, social benefits and strategic significance which has been widely used in mobile communications, digital products and other fields and is most likely to become the most important power system in the field of energy storage and electric vehicles.

Separator is an important part of the battery which serves primarily to prevent contact of cathode and anode and allow ion conduction. At present, the commercialized lithium-ion batteries mainly use polyolefin separator materials with microporous structure, such as single layer or multi-layer films of polyethylene (PE) and polypropylene (PP). Due to the characteristics of the polymer itself, polyolefin separators provide sufficient mechanical strength and chemical stability at ambient temperature but exhibit obvious thermal shrinkage at high temperature, thus resulting cathode and anode contact and rapid accumulation of large amounts of heat. For PP/PE dopamine-modified ceramic composite separator, although PE melting occurs at a low temperature of 120° C. to clog micropores in the polymer and block ion conduction while PP still functions as a support to prevent further electrode reaction, if the temperature rises rapidly exceeding the melting temperature of PP which is only 150° C., melting of the separator will cause a large area short circuit and lead to thermal runaway which exacerbating the heat accumulation, resulting in high internal battery pressure and causing the battery to burn or explode finally. Battery internal short circuit is the biggest hidden danger of lithium-ion battery safety. In order to meet the requirements of high-capacity lithium-ion battery, the development of high safety separator has become a top priority of the industry. Among these, ceramic-coated separator with excellent temperature resistance and high safety is one of the main options for replacing traditional polyolefin separator.

Ceramic-coated separators are porous safety function separators prepared by coating uniform protective layers composed of ceramic micro-particles and the like onto single-side or double-side of the surface of conventional polyolefin microporous support layers, which improving the thermal stability and reducing heat shrinkage on the basis of ensuring the original characteristics of the polyolefin microporous separator, thereby effectively reducing the internal short circuit of the lithium-ion batteries and preventing thermal runway caused by internal short circuit.

At present, ceramic-coated separators are mainly prepared by dispersing ceramic particles (mainly nano or submicron oxide particles such as $Al_2O_3$, $SiO_2$, $TiO_2$, etc.), binders and the like in a solvent to form a slurry and then using the slurry to form ceramic layers on the surface of polyolefin support layers via tape casting or dip-molding (see Journal of Power Sources 195 (2010) 6192-6196, CN200580036709.6, CN200780035135.X, etc.). However, since the ceramic particles are easy to agglomerate because of large specific surface energy and the surface of the ceramic particles are generally hydrophilic while the polyolefin film is a hydrophobic material, therefore, from the majority of studies, ceramic powder is of poor coating uniformity and the coating comes off easily, which may greatly affect the ceramic-coated separator in lithium-ion battery performance. In addition, although the coating of ceramic powder can improve the affinity of ceramic-coated separator with the electrolyte, ceramic-coated separator still has a certain risk of liquid leakage due to the poor wetting ability of the support layer and the electrolyte.

SUMMARY OF THE INVENTION

One objective of present invention is to provide a modified ceramic composite separator and application thereof to overcome the disadvantage of the prior art.

Another objective of present invention is to provide a lithium-ion battery having the above-mentioned modified ceramic composite separator.

Another objective of present invention is to provide the application of the above-mentioned modified ceramic composite separator.

A modified ceramic composite separator of present invention comprises a ceramic-coated separator which comprising an organic support layer and a ceramic layer coated on the surface of the support layer in a thickness of 0.1 μm to 20 μm, further comprises a dopamine polymer grown in-situ on the surface and interior of the support layer and the ceramic layer or other polymer selected at least one from the group consisting of polymethylmethacrylate, polyvinylidene fluoride-hexafluoropropylene, polyacrylonitrile, polyimide, polyetheramide, polyoxyethane and polyoxyethylene.

The manufacturing method of present invention is as follows:

A method for manufacturing a modified ceramic composite separator comprising a ceramic-coated separator which comprising an organic support layer and a ceramic layer coated on the surface of the support layer in a thickness of 0.1 μm to 20 μm, further comprising a dopamine polymer grown in-situ on the surface and interior of the support layer. The dopamine polymer is polydopamine, 5-hydroxy-polydopamine, polydopamine acrylamide or a copolymer of a monomer M and polydopamine acrylamide. The method of in-situ growth comprises the steps of immersing the ceramic-coated separator in an alkaline solution of a monomer of the dopamine polymer and reacting for 5 to 40 hours at 10 to 70° C., wherein the solvent of the alkaline solution is a mixture of water and an organic solvent, the volume ratio of water to the organic solvent is 2~3:0~1, the inorganic power in the ceramic layer has a particle size of 5 nm to 10 μm, and the material of the organic support layer has a molecular weight of 1000-100000000. The monomer M includes at least one of methyl methacrylate, ethyl methacrylate, butyl methacrylate, isobutyl methacrylate, hydroxyethyl methacrylate, ethylene glycol methyl methacrylate, polyethylene glycol dimethacrylate, methyl 3-methoxyacrylate, methyl acrylate, ethyl acrylate, lauryl methacrylate, trifluoroethyl acrylate, glycidyl methacrylate, 2-ethyl-2-acrylic-2-ethyl-2-[[(2-methyl-1-oxy-2-propenyl)oxy]methyl]-1,3-propanediyl ester, trimethylsilyl methacrylate, triethylene glycol dimethacrylate, 1,1,1,3,3,3-hexakis fluoroisopropyl acrylate, trifluoroethyl acrylate, tetraethylene glycol diacrylate, 2,2,3,3-tetrafluoropropyl methacrylate, tetrahydrofurfuryl acrylate, and 2-(2-ethoxyethoxy) ethyl acrylate.

Another method for manufacturing a polymer modified composite separator comprising a ceramic-coated separator which comprising an organic support layer and a ceramic layer coated on the surface of the support layer in a thickness of 0.1 μm to 20 μm, further comprising a polymer grown in-situ on the surface and interior of the support layer. The polymer is at least one selected from polymethylmethacrylate, polyvinylidene fluoride-hexafluoropropylene, polyacrylonitrile, polyimide, polyetheramide, polyoxyethane and polyoxyethylene. The method of in-situ growth comprising the steps of immersing the ceramic-coated separator in a monomer solution of the polymer and reacting for 5 to 40 hours at 10 to 70° C., wherein the solvent of the monomer solution is a mixture of water and an organic solvent or a mixture of a strong polar solvent and a poor polar solvent, the volume ratio of water to the organic solvent and the volume ratio of the strong polar solvent to the poor polar solvent is 2~3:0~1 respectively, an inorganic power in the ceramic layer has a particle size of 5 nm to 10 μm, and the material of the organic support layer has a molecular weight of 1000-100000000.

In a preferred embodiment, the material of the organic support layer comprises at least one selected from the group consisting of polyolefin porous polymer, polytetrafluoroethylene, polyvinylidene fluoride, polyethylene, polyvinyl chloride, poly-m-phenylene isophthalamide resin, polyethylene terephthalate, polyvinylidene fluoride-hexafluoropropylene copolymer, polymethylmethacrylate, polyacrylonitrile, polyimide, polyvinylpyrrolidone, polyethylene oxide, polyvinyl alcohol and a blending, copolymerization system derived from above polymers.

In a preferred embodiment, the inorganic power is at least one selected from the group consisting of $Al_2O_3$, $TiO_2$, $SiO_2$, $ZrO_2$, $SnO_2$, MgO, ZnO, $BaSO_4$, BN, AlN and $Mg_3N_2$.

In a preferred embodiment, the ceramic layer has a thickness of 0.5 μm to 5 μm.

In a preferred embodiment, the inorganic power has a particle size of 50 nm to 10 μm.

In a preferred embodiment, the material of the organic support layer has a molecular weight of 100000 to 1000000.

Another technical proposal of the present invention is that:

A lithium-ion battery comprises an anode material and a cathode material, and further comprises above-mentioned modified ceramic composite separator deposed between the cathode material and the anode material.

Another technical proposal of the present invention is that:

The application of above-mentioned modified ceramic composite separator in lithium-ion battery.

Anode materials commonly used in lithium-ion batteries can be used in the present invention. Compounds capable of reversibly occluding and releasing (intercalating and deintercalating) lithium ions can be used as the anode active materials. Examples of the anode active materials include lithium-containing composite oxides such as $Li_xMO_2$ or $Li_yM_2O_4$ (wherein M is a transition metal, $0 \le X \le 1$, $0 \le y \le 2$), spinel-like oxides, layered metal sulfides, olivine structures, and the like.

Specifically, lithium cobalt oxides such as $LiCoO_2$, lithium manganese oxides such as $LiMn_2O_4$, lithium nickel oxides such as $LiNiO_2$, lithium titanium oxides such as $Li_{4/3}Ti_{5/3}O_4$, lithium manganese nickel composite oxides, lithium manganese nickel cobalt composite Oxides and materials having an olivine-type crystal structure such as $LiMPO_4$ (M=Fe, Mn, Ni) and the like are preferable.

Particularly preferred are lithium-containing composite oxides with layered structure or spinel structure, such as lithium-manganese-nickel composite oxides typified by $LiCoO_2$, $LiMn_2O_4$, $LiNiO_2$, $LiNi_{1/2}O_2$ and the like, lithium-manganese-nickel-cobalt composite oxides typified by $LiNi_{1/3}Mn_{1/3}Co_{1/3}O_2$, $LiNi_{0.6}Mn_{0.2}Co_{0.2}O_2$ and the like, or $LiNi_{1-x-y-z}Co_xAl_yMg_zO_2$ ($0 \le x \le 1$, $0 \le y \le 0.1$, $0 \le z \le 0.1$, $0 \le 1-x-y-z \le 1$) and other lithium-containing composite oxides. In addition, lithium-containing composite oxide with additional elements of Ge, Ti, Zr, Mg, Al, Mo, Sn replacing some of the constituent elements in the lithium-containing composite oxides described above are also included.

These anode active materials may be used alone or in combination of two or more kinds. For example, by using both a layered lithium-containing composite oxide and a spinel lithium-containing composite oxide, both an increase in capacity and safety can be achieved.

Further, a method for producing a anode for constituting a non-aqueous electrolyte secondary battery is exemplified by a method in which adding conductive assistants such as carbon black, acetylene black, or binders such as polyvinylidene fluoride, polyethylene oxide appropriately to the above anode active materials to prepare anode mixture, and coating the anode mixture on a belt-shaped molded product having a current collector made of aluminum foil or the like as a core material. However, the method of making anode is not limited to the above example.

Cathode materials commonly used for lithium-ion batteries can be used in the present invention. Compounds capable of intercalating and deintercalating lithium metal and lithium can be used as cathode active materials such as alloys or oxides of aluminum, silicon, and tin, and carbon materials. Examples of oxides include titanium dioxide. Examples of carbon materials include graphite, pyrolytic carbons, cokes, glassy carbons, calcined organic polymer compounds, and mesocarbon microbeads.

a method for producing a cathode for constituting a non-aqueous electrolyte secondary battery is exemplified by a method in which adding conductive assistants such as carbon black, acetylene black, or binders such as polyvinylidene fluoride, polyethylene oxide appropriately to the above cathode active materials to prepare cathode mixture, and coating the cathode mixture on a belt-shaped molded product having a current collector made of copper foil or the like as a core material. However, the method of making cathode is not limited to the above example.

Preferably, non-aqueous solvents (organic solvents) are used as nonaqueous electrolytic solutions of non-aqueous electrolyte secondary batteries provided by present invention. Non-aqueous solvents include carbonates, ethers and the like.

More preferably, the carbonates include cyclic carbonates and chain carbonates. Examples of cyclic carbonates include ethylene carbonate, propylene carbonate, butylene carbonate, γ-butyrolactone, thioester (glycol sulfide, etc.) and the like. Examples of chain carbonates include low-viscosity polar chain carbonates and aliphatic branched carbonate-based compounds typified by dimethyl carbonate, diethyl carbonate and methyl ethyl carbonate. Mixed solvents of cyclic carbonates (particularly, ethylene carbonate) and chain carbonates are particularly preferable. Ethers include dimethyl ether tetraethylene glycol (TEGDME), ethylene glycol dimethyl ether (DME), 1,3-dioxolane (DOL) and the like.

In addition to the above-mentioned non-aqueous solvents (Organic solvents), chain alkyl esters such as methyl propionate and the like, chain phosphate triesters such as trimethyl phosphate, nitrile-based solvents such as 3-methoxypropionitrile and branched compounds having ether bond such as dendrimer are also included.

Moreover, fluorine-based solvents may also be used as non-aqueous solvents, such as $H(CF_2)_2OCH_3$, $C_4F_9OCH_3$, $H(CF_2)_2OCH_2CH_3$, $H(CF_2)_2OCH_2CF_3$, $H(CF_2)_2CH_2O(CF_2)_2H$ or alkyl ether (perfluoroalkyl) of linear structure such as $CF_3CHFCF_2OCH_3$, $CF_3CHFCF_2OCH_2CH_3$ and so on, like 2-trifluoromethyl hexafluoropropyl methyl ether, 2-trifluoromethyl hexafluoropropyl ethyl ether, 2-trifluoromethyl hexafluoropropyl propyl ether, 3-trifluoromethyl octafluorobutyl methyl ether, 3-trifluoromethyl octafluorobutylethyl ethyl ether, 3-trifluoromethyl octafluorobutyl propyl ether, 4-trifluoromethyl decafluoropentyl methyl ether, 4-trifluoromethyl decafluoropentyl ethyl ether, 4-trifluoromethyl decafluoropentyl propyl ether, 5-trifluoromethyl dodecafluorohexyl methyl ether, 5-trifluoromethyl dodecafluorohexyl ethyl ether, 5-trifluoromethyl dodecafluorohexyl propyl ether, 6-trifluoromethyl tetradecafluoroheptyl methyl ether, 6-trifluoromethyl tetradecafluoroheptyl ethyl ether, 6-trifluoromethyl tetradecafluoroheptyl propyl ether, 7-trifluoromethyl hexadecafluorooctyl methyl ether, 7-trifluoromethyl hexadecafluorooctyl ethyl ether, 7-trifluoromethyl hexadecafluorooctyl propyl ether and so on.

Moreover, the above-mentioned isoalkyl (perfluoroalkyl) ether and linear (perfluoroalkyl) alkyl ether may be used together.

The electrolyte salts used for non-aqueous electrolyte are preferably lithium salts such as lithium perchlorates, organic boron lithium salts, lithium salt having fluorine compound and lithium imide salts, such as $LiClO_4$, $LiPF_6$, $LiBF_4$, $LiAsF_6$, $LiSbF_6$, $LiCF_3SO_3$, $LiCF_3CO_2$, $LiC_2F_4(SO_3)_2$, $LiN(C_2F_5SO_2)_2$, $LiC(CF_3SO_2)_3$, $LiC_nF_{2n+1}SO_3(n\geq2)$ and $LiN(RfOSO_2)_2$ (wherein Rf is fluoroalkyl group). Among these lithium salts, fluorine-containing organic lithium salts are particularly preferable. Fluorine-containing organic lithium salts are easily dissolved in non-aqueous electrolytes because they are anionic and easily separated into ions.

The concentration of the electrolyte lithium salt in the nonaqueous electrolytic solution is preferably 0.3 mol/L to 1.7 mol/L, and more preferably 0.7 mol/L to 1.2 mol/L. Too low concentration of the electrolyte lithium salt may lead to too small ion conductivity, and too high concentration may lead to precipitation of electrolyte salt not being dissolved completely.

Various additives capable of improving the performance of the batteries can be added into the non-aqueous electrolyte solution, which are not particularly limited.

The beneficial effects of the present invention are:

The modified ceramic composite separator of present invention comprises polymer grown in-situ on the surface and interior of the support layer and the ceramic layer. The polymer can effectively reduce the come-off of powder of the ceramic layer and the safety concern caused by liquid leakage, effectively improve the physical performance and electrochemical performance of the separator, and also increase the interface stability between electrolytes and electrodes which can effectively inhibit the growth of lithium dendrites, and therefore is advantageous in increasing the capacity retention capability of a battery.

DETAILED DESCRIPTION OF THE EMBODIMENTS

The present invention will be further described with the drawings and the embodiments.

Embodiment 1

1 g of a mixture consisting of synthesized alumina nanoparticles, sodium carboxy methyl cellulose (CMC) and styrene butadiene rubber (SBR) in mass ratio of 95:2:3 is added into 10 mL of a mixed solution of deionized water and acetone (3:1, v:v). The resulting ceramic slurry is milled overnight and ultrasonically dispersed for 20 minutes as preparation for coating. Ordinary polyethylene (PE) separator is used as support layer for fabricating ceramic-coated separator. The resulting slurry was uniformly coated on one side of an ordinary polyethylene (PE) separator, preheated with a hot plate at 60° C., and dried under a vacuum oven at 60° C. overnight to completely remove the solvent after most of the solvent volatilized to obtain a ceramic-coated separator.

0.1 g of dopamine hydrochloride (DA) is added into 5 mL of a mixture solvent of water and ethanol (1:1, V:V) and stirred mechanically for 1 hour to prepare a monomer solution for fabricating dopamine modified ceramic composite separator. The ceramic-coated separator is immersed in the monomer solution and ammonia is added to adjust the pH to 8.5. After reacting in standing at 20° C. for 5 h, a dopamine modified ceramic composite separator is obtained. The dopamine modified ceramic composite separator is preheated with a hot plate at 60° C., and dried under a vacuum oven at 60° C. overnight to completely remove the solvent after most of the solvent volatilized to obtain a ceramic-coated separator protected by polydopamine (PDA) polymer layer.

Figure 1:
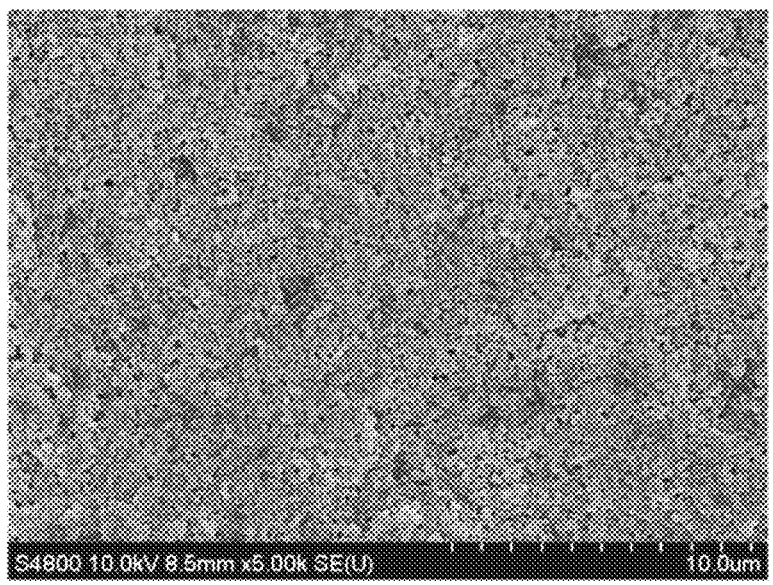
FIG. 1 illustrates SEM photo of the surface of the alumina inorganic ceramic layer separator of embodiment 1 of the present invention.
Figure 2:
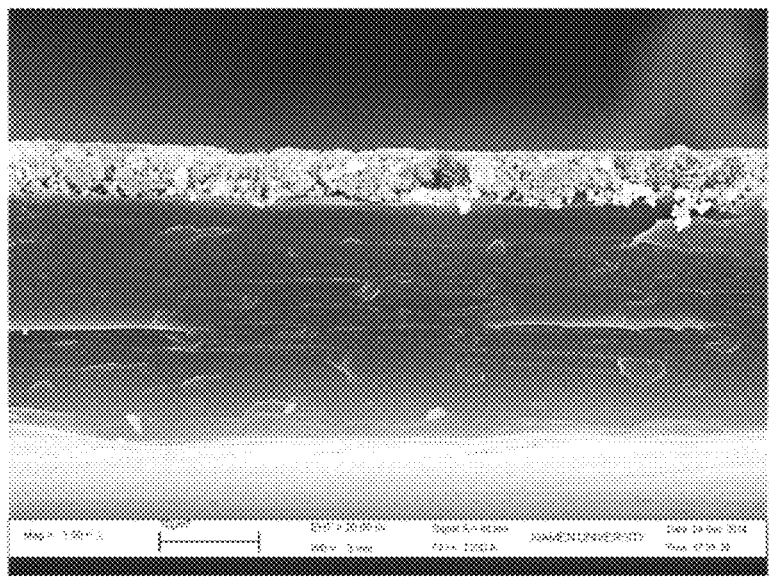
FIG. 2 illustrates SEM photo of the cross-section of the alumina inorganic ceramic layer separator of embodiment 1 of the present invention.

FIG. 1 shows a SEM image of the modified ceramic-coated separator containing alumina as inorganic powder. From the photographs, it can be clearly observed that the alumina powder is evenly spread on the surface of the ordinary separator. The inorganic nanoparticles have spherical, linear, nanotubular, hexahedron and other shapes. Alumina has $\alpha$, $\gamma$, rutile and other crystalline forms. FIG. 2 is a cross-section SEM image of the ceramic-coated separator. The figure shows that the ceramic layer is a uniform coating in a thickness of 3 μm.

Embodiment 2

1 g of a mixture consisting of silica nanoparticles and polyacrylate terpolymer latex (LA132) in mass ratio of 90:4:6 is added into 15 mL of a mixed solution of sodeionized water and ethanol (3:1, v:v). The resulting ceramic slurry is milled overnight and ultrasonically dispersed for 30 minutes as preparation for coating. Ordinary polypropylene (PP) separator is used as support layer for fabricating ceramic-coated separator. The resulting slurry was uniformly coated on double sides of an ordinary polypropylene (PP) separator, preheated with a hot plate at 60° C., and dried under a vacuum oven at 60° C. overnight to completely remove the solvent after most of the solvent volatilized to obtain a ceramic-coated separator.

0.2 g of dopamine hydrochloride (DA) is added into 10 mL of a mixture solvent of water and ethanol (2:1, V:V) and stirred mechanically for 2 hours to prepare a monomer solution for fabricating dopamine modified ceramic composite separator. The ceramic-coated separator is immersed in the monomer solution and ammonia is added to adjust the pH to 9.5. After reacting in standing at 30° C. for 10 h, a dopamine modified ceramic composite separator is obtained. The dopamine modified ceramic composite separator is preheated with a hot plate at 60° C., and dried under a vacuum oven at 60° C. overnight to completely remove the solvent after most of the solvent volatilized to obtain a ceramic-coated separator protected by polydopamine (PDA) polymer layer.

Figure 3:
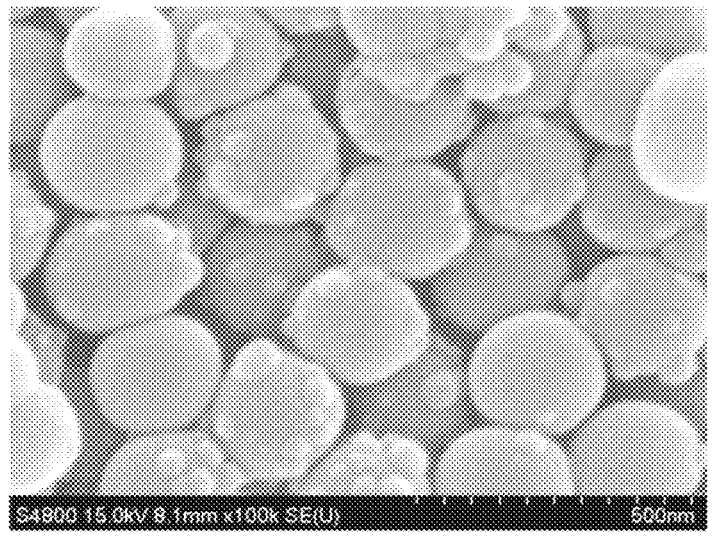
FIG. 3 illustrates SEM photo of the surface of the dopamine modified ceramic composite separator of embodiment 2 of the present invention.
Figure 4:
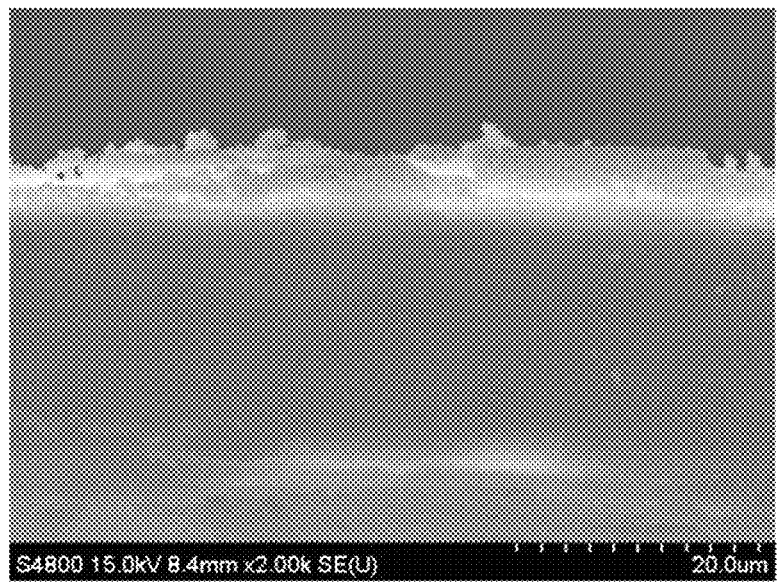
FIG. 4 illustrates SEM photo of the cross-section of the dopamine modified ceramic composite separator of embodiment 2 of the present invention.

FIG. 3 shows a SEM image of the dopamine modified ceramic composite separator. From the photographs, it can be clearly observed that a polydopamine layer is coated on the surface of the ceramic-coated separator; however, polydopamine nanoparticles are formed on the surface of the inorganic particles simultaneously. FIG. 4 is a cross-section SEM image of the dopamine modified ceramic composite separator. The figure shows that the polymer layer is a ceramic layer with a uniform thickness.

Figure 5:
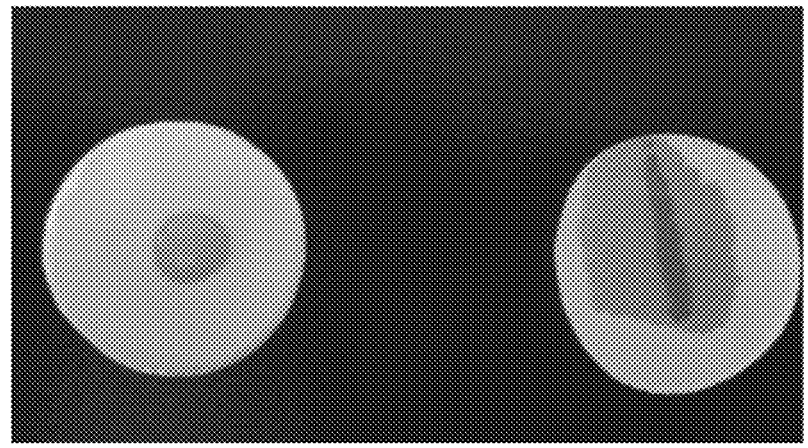
FIG. 5 illustrates electrolyte wettability comparison between the dopamine modified ceramic composite separator of embodiment 2 and the polyethylene separator (left: the polyethylene separator, right: the dopamine modified ceramic composite separator of embodiment 2).

FIG. 5 shows wettability comparison between the dopamine modified ceramic composite separator containing silica as inorganic powder and ordinary polyethylene separator, wherein the left one is the polyethylene separator and the right one is dopamine modified ceramic composite separator. The result suggested that the dopamine modified ceramic composite separator performs better wettability.

Embodiment 3

1 g of a mixture consisting of magnesium oxide nanoparticles and polyacrylate terpolymer latex (LA133) in mass ratio of 85:6:9 is added into 20 mL of a mixed solution of deionized water and acetone (3:1, v:v). The resulting ceramic slurry is milled overnight and ultrasonically dispersed for 40 minutes as preparation for coating. Polyvinylidene fluoride (PVDF) separator is used as support layer for fabricating ceramic-coated separator. The resulting slurry was uniformly coated on one side or double sides of a polyvinylidene fluoride (PVDF) separator, preheated with a hot plate at 60° C., and dried under a vacuum oven at 60° C. overnight to completely remove the solvent after most of the solvent volatilized to obtain a ceramic-coated separator.

0.1 g of dopamine acrylamide (DMA) is added into 10 mL of a mixture solvent of water and ethanol (3:1, V:V) and stirred mechanically for 1 hours to prepare a monomer solution for fabricating dopamine acrylamide modified ceramic composite separator. The ceramic-coated separator is immersed in the monomer solution and ammonia is added to adjust the pH to 9. After reacting in standing at 40° C. for 20 h, a dopamine modified ceramic composite separator is obtained. The dopamine modified ceramic composite separator is preheated with a hot plate at 60° C., and dried under a vacuum oven at 60° C. overnight to completely remove the solvent after most of the solvent volatilized to obtain a ceramic-coated separator protected by dopamine acrylamide polymer layer.

Figure 6:
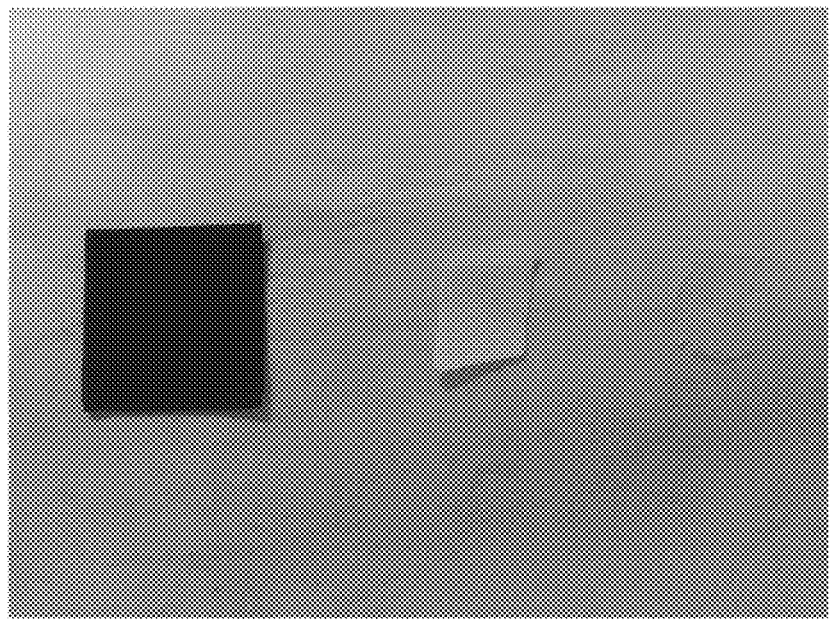
FIG. 6 illustrates thermal shrinkage performance of the dopamine acrylamide modified ceramic composite separator of embodiment 3 and the polyolefin separator after being held at 140° C. for half of an hour (left: the dopamine modified ceramic composite separator of embodiment 3, middle: the ceramic-coated separator, right: the polyolefin separator).

FIG. 6 shows thermal shrinkage comparison between the dopamine acrylamide modified ceramic composite separator of this embodiment and polyolefin separator after being held at 140° C. for half of an hour, wherein the left one is the dopamine modified ceramic composite separator, the middle one is the ceramic-coated separator and the right one is the polyolefin separator.

Embodiment 4

1 g of a mixture consisting of titanium oxide nanoparticles, gelatin and polyvinyl alcohol (PVA) in mass ratio of 80:8:12 is added into 25 mL of a mixed solution of deionized water and ethanol (3:1, v:v). The resulting ceramic slurry is milled overnight and ultrasonically dispersed for 50 minutes as preparation for coating. Polyamide (PI) separator is used as support layer for fabricating ceramic-coated separator. The resulting slurry was uniformly coated on one side or double sides of a polyamide (PI) separator, preheated with a hot plate at 60° C., and dried under a vacuum oven at 60° C. overnight to completely remove the solvent after most of the solvent volatilized to obtain a ceramic-coated separator.

0.2 g of dopamine acrylamide (DMA) and 0.5 g of methyl acrylate (MMA) are added into 10 mL of water solvent and stirred mechanically for 1 hours to prepare a monomer solution for fabricating dopamine acrylamide-methyl methacrylate copolymer modified ceramic composite separator. The ceramic-coated separator is immersed in the monomer solution and the initiator of sodium dodecyl sulfate (SDS) is added. After reacting in standing at 30° C. for 10 h in an inert atmosphere, a dopamine modified ceramic composite separator is obtained. The dopamine modified ceramic composite separator is preheated with a hot plate at 60° C., and dried under a vacuum oven at 60° C. overnight to completely remove the solvent after most of the solvent volatilized to obtain a ceramic-coated separator protected by dopamine acrylamide-methyl methacrylate copolymer layer.

Embodiment 5

1 g of a mixture consisting of copper oxide particles, carboxyl methyl cellulose (CMC) and styrene-butadiene rubber (SBR) in mass ratio of 75:10:15 is added into 30 mL of a mixed solution of deionized water and ethanol (3:1, v:v). The resulting ceramic slurry is milled overnight and ultrasonically dispersed for 60 minutes as preparation for coating. Polyvinyl chloride (PVC) separator is used as support layer for fabricating ceramic-coated separator. The resulting slurry was uniformly coated on one side or double sides of a polyvinyl chloride (PVC) separator, preheated with a hot plate at 60° C., and dried under a vacuum oven at 60° C. overnight to completely remove the solvent after most of the solvent volatilized to obtain a ceramic-coated separator.

0.4 g of dopamine acrylamide (DMA) and 0.1 g of ethyl methacrylate (EMA) are added into 20 mL of a mixture solvent of water and ethanol (4:1, V:V) and stirred mechanically for 1 hours to prepare a monomer solution for fabricating dopamine modified ceramic composite separator. The ceramic-coated separator is immersed in the monomer solution and the initiator is added. After reacting in standing at 40° C. for 30 h in an inert atmosphere, a dopamine modified ceramic composite separator is obtained. The dopamine modified ceramic composite separator is preheated with a hot plate at 60° C., and dried under a vacuum oven at 60° C. overnight to completely remove the solvent after most of the solvent volatilized to obtain a ceramic-coated separator protected by dopamine acrylamide-methyl acrylate copolymer layer.

Comparative Embodiment 1

A battery comprises an anode material, a cathode material and a commercialized separator deposed between the cathode material and the anode material.

Embodiment 6

Figure 7:
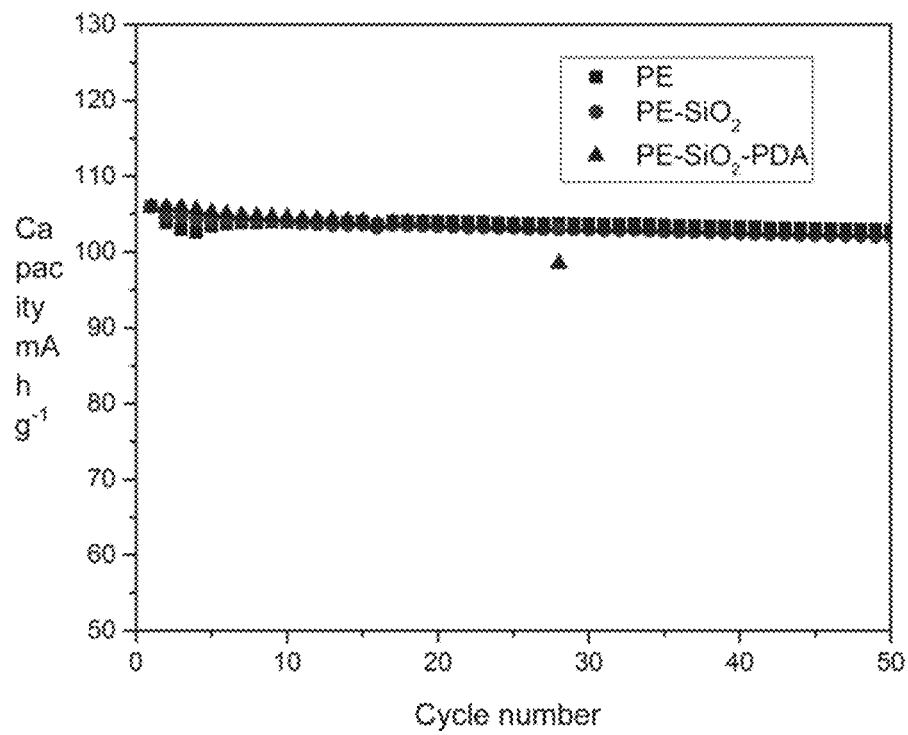
FIG. 7 illustrates cycle performances of the battery of embodiment 6 with the dopamine modified ceramic composite separator of embodiment 2 and the common separator of comparative embodiment 1.

A battery comprises an anode material, a cathode material and a dopamine modified ceramic composite separator of embodiment 1 deposed between the cathode material and the anode material. FIG. 7 shows cycle performances of the battery of embodiment 6 and comparative embodiment 1. It can be seen that the cycle performance of the battery with the dopamine modified ceramic composite separator of present invention is significantly improved over the battery with the separator of prior art.

Embodiment 7

A battery comprises an anode material, a cathode material and a dopamine modified ceramic composite separator of embodiment 2 deposed between the cathode material and the anode material.

Embodiment 8

A battery comprises an anode material, a cathode material and a dopamine modified ceramic composite separator of embodiment 3 deposed between the cathode material and the anode material.

Embodiment 9

A battery comprises an anode material, a cathode material and a dopamine modified ceramic composite separator of embodiment 4 deposed between the cathode material and the anode material.

Embodiment 10

A battery comprises an anode material, a cathode material and a dopamine modified ceramic composite separator of embodiment 5 deposed between the cathode material and the anode material.

Those skilled in the art can know that the specific technical parameters and components of the present invention can still achieve the same or similar technical effects as those of the above embodiments when they are changed within the following ranges:

Embodiment 11

1 of a mixture consisting of magnesium oxide nanoparticles, carboxyl methyl cellulose (CMC) and styrene-butadiene rubber (SBR) in mass ratio of 95:2:3 is added into 10 mL of a mixed solution of deionized water and acetone (3:1, v:v). The resulting ceramic slurry is milled overnight and ultrasonically dispersed for 20 minutes as preparation for coating. Ordinary polyethylene (PE) separator is used as support layer for fabricating ceramic-coated separator. The resulting slurry was uniformly coated on one side of an ordinary polyethylene (PE) separator, preheated with a hot plate at 60° C., and dried under a vacuum oven at 60° C. overnight to completely remove the solvent after most of the solvent volatilized to obtain a ceramic-coated separator.

0.2 g of methyl acrylate (MMA) is added into 5 mL of a mixture solvent of nitrogen-methylpyrrolidone and acetone (1:1, V:V) and stirred mechanically for 10 hours. The resulting slurry is used for coating and the ceramic-coated separator is used as support layer. The resulting slurry was uniformly coated on the surface of the ceramic layer of the ceramic-coated separator, preheated with a hot plate at 60° C., and dried under a vacuum oven at 60° C. overnight to completely remove the solvent after most of the solvent volatilized to obtain a polymer modified ceramic composite separator.

0.1 g of methyl acrylate (MMA) is added into 5 mL of a mixture solvent of water and ethanol (5:1, V:V) and stirred mechanically for 1 hours to prepare a monomer solution for fabricating methyl methacrylate modified ceramic composite separator. The prepared ceramic-coated separator is immersed in the monomer solution. After reacting in standing at 20° C. for 5 h, a polymethyl acrylate modified ceramic composite separator is obtained. The polymethyl acrylate modified ceramic composite separator is preheated with a hot plate at 60° C., and dried under a vacuum oven at 60° C. overnight to completely remove the solvent after most of the solvent volatilized to obtain a ceramic-coated separator protected by polymethyl acrylate layer.

Figure 8:
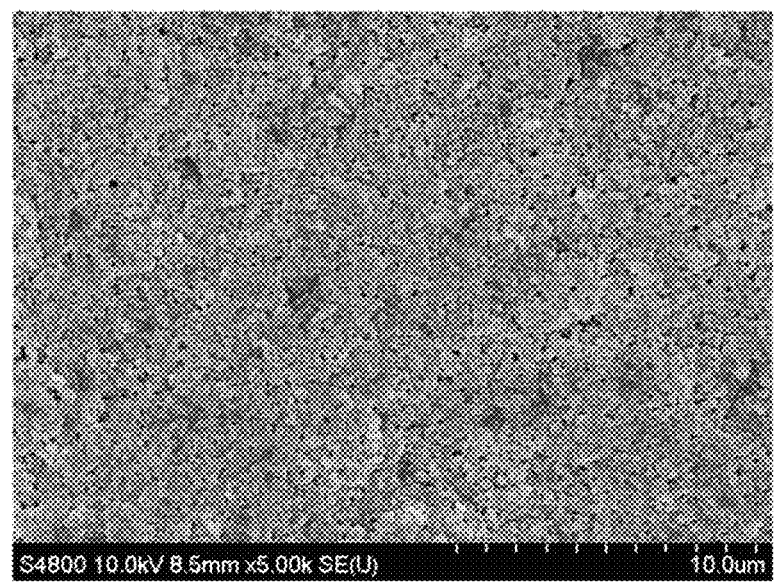
FIG. 8 illustrates SEM photo of the surface of the alumina inorganic ceramic layer separator of embodiment 11 of the present invention.

FIG. 8 shows a SEM image of the modified ceramic-coated separator containing alumina as inorganic powder.

Figure 9:
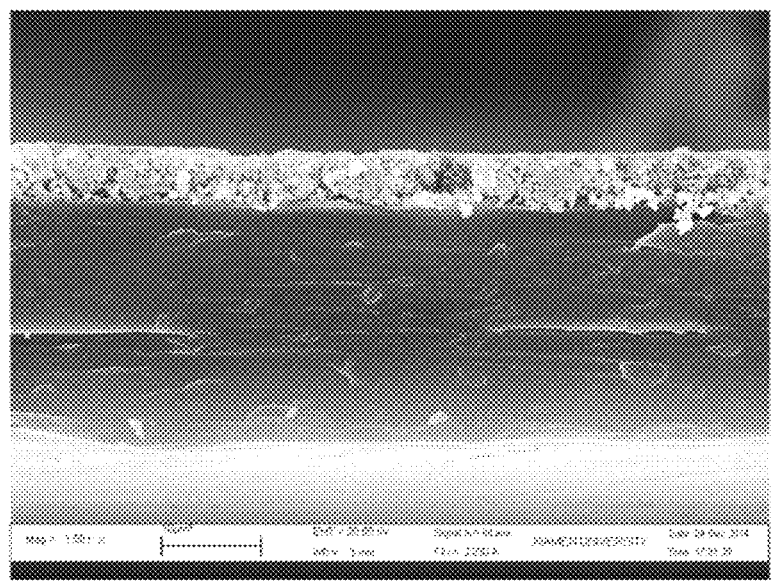
FIG. 9 illustrates SEM photo of the cross-section of the alumina inorganic ceramic layer separator of embodiment 11 of the present invention.

From the photographs, it can be clearly observed that the alumina powder is evenly spread on the surface of the ordinary separator. The inorganic nanoparticles have spherical, linear, nanotubular, hexahedron and other shapes. Alumina has α, γ, rutile and other crystalline forms. FIG. 9 is a cross-section SEM image of the ceramic-coated separator. The figure shows that the ceramic layer is a uniform coating in a thickness of 3 μm.

Embodiment 12

1 g of a mixture consisting of silica nanoparticles and polyacrylate terpolymer latex (LA132) in mass ratio of 90:4:6 is added into 15 mL of a mixed solution of deionized water and ethanol (3:1, v:v). The resulting ceramic slurry is milled overnight and ultrasonically dispersed for 30 minutes as preparation for coating. Ordinary polypropylene (PP) separator is used as support layer for fabricating ceramic-coated separator. The resulting slurry was uniformly coated on double sides of an ordinary polypropylene (PP) separator, preheated with a hot plate at 60° C., and dried under a vacuum oven at 60° C. overnight to completely remove the solvent after most of the solvent volatilized to obtain a ceramic-coated separator.

0.2 g of methyl acrylate (MMA) is added into 10 mL of a mixture solvent of water and ethanol (10:1, V:V) and stirred mechanically for 5 hours to prepare a monomer solution for fabricating methyl acrylate modified ceramic composite separator. The ceramic-coated separator is immersed in the monomer solution. After reacting in standing at 30° C. for 10 h, a polymethyl methacrylate modified ceramic composite separator is obtained. The dopamine modified ceramic composite separator is preheated with a hot plate at 60° C., and dried under a vacuum oven at 60° C. overnight to completely remove the solvent after most of the solvent volatilized to obtain a ceramic-coated separator protected by polymethyl methacrylate layer.

Figure 10:
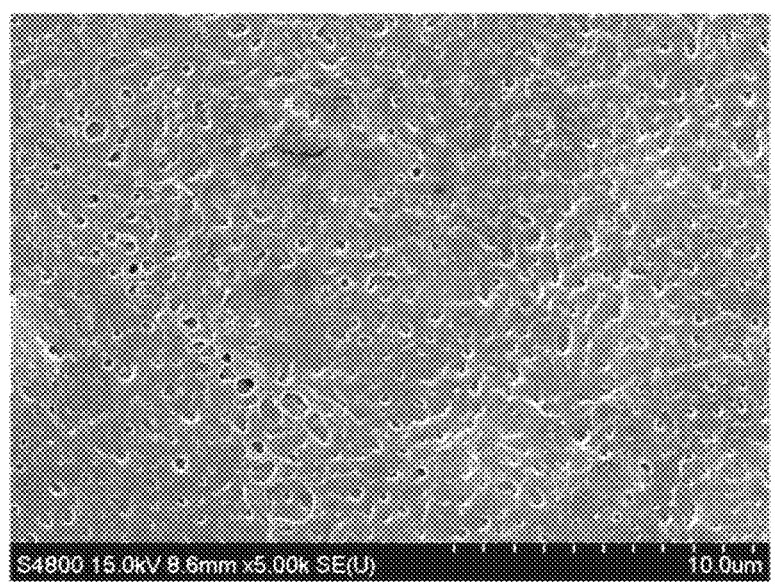
FIG. 10 illustrates SEM photo of the surface of the polymer modified ceramic composite separator of embodiment 12 of the present invention.
Figure 11:
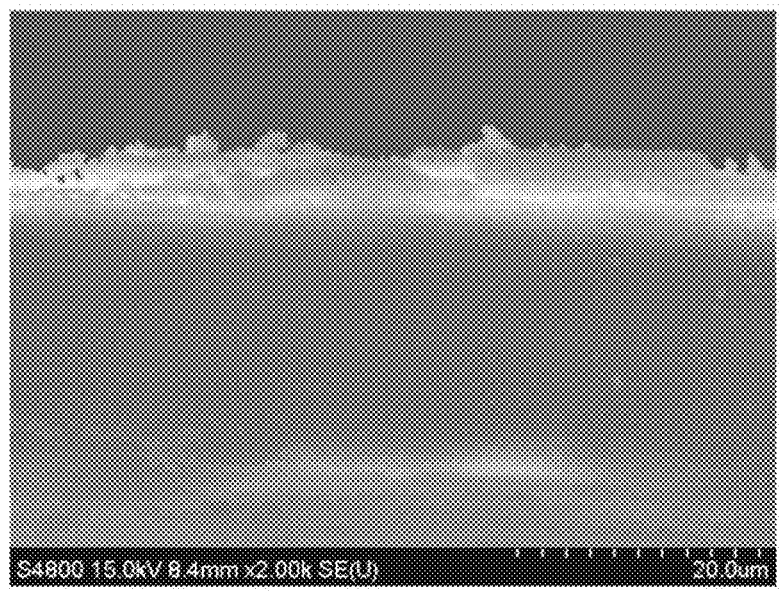
FIG. 11 illustrates SEM photo of the cross-section of the polymer modified ceramic composite separator of embodiment 12 of the present invention.

FIG. 10 shows a SEM image of the polymer modified ceramic composite separator with polymethyl methacrylate as protective layer. From the photographs, it can be clearly observed that polymethyl methacrylate is uniformly dispersed on the surface of the ceramic-coated separator and inside the ceramic layer. FIG. 11 is a cross-section SEM image of the polymethyl methacrylate modified ceramic composite separator. The figure shows that the polymer layer is a ceramic layer in a thickness of 3 μm.

Figure 12:
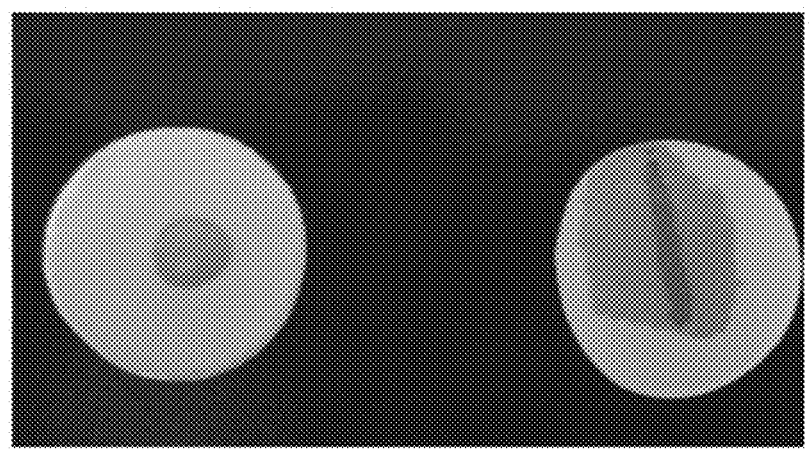
FIG. 12 illustrates electrolyte wettability comparison between the polymer modified ceramic composite separator of embodiment 12 and the polyethylene separator (left: the polyethylene separator, right: the polymer modified ceramic composite separator of embodiment 12).

FIG. 12 shows wettability comparison between the polymer modified ceramic composite separator and ordinary polyethylene separator, wherein the left one is the polyethylene separator and the right one is the polymer modified ceramic composite separator. The result suggested that the polymer modified ceramic composite separator performs better wettability.

Embodiment 13

1 g of a mixture consisting of magnesium oxide nanoparticles and polyacrylate terpolymer latex (LA133) in mass ratio of 85:6:9 is added into 20 mL of a mixed solution of deionized water and acetone (3:1, v:v). The resulting ceramic slurry is milled overnight and ultrasonically dispersed for 40 minutes as preparation for coating. Polyvinylidene fluoride (PVDF) separator is used as support layer for fabricating ceramic-coated separator. The resulting slurry was uniformly coated on one side or double sides of a polyvinylidene fluoride (PVDF) separator, preheated with a hot plate at 60° C., and dried under a vacuum oven at 60° C. overnight to completely remove the solvent after most of the solvent volatilized to obtain a ceramic-coated separator.

0.5 g of biphenyl tetracarboxylic dianhydride (BPDA) and 0.5 g of p-phenylenediamine (PDA) are added into 10 mL of a mixture solvent of nitrogen-methylpyrrolidone and acetone (5:1, V:V) and stirred mechanically for 10 hours to prepare a monomer solution for fabricating polyimide modified ceramic composite separator. The ceramic-coated separator is immersed in the monomer solution. After reacting in standing at 40° C. for 10 h, a polyimide modified ceramic composite separator is obtained. The polyimide modified ceramic composite separator is preheated with a hot plate at 60° C., and dried under a vacuum oven at 60° C. overnight to completely remove the solvent after most of the solvent volatilized to obtain a ceramic-coated separator protected by dopamine acrylamide polymer layer.

Figure 13:
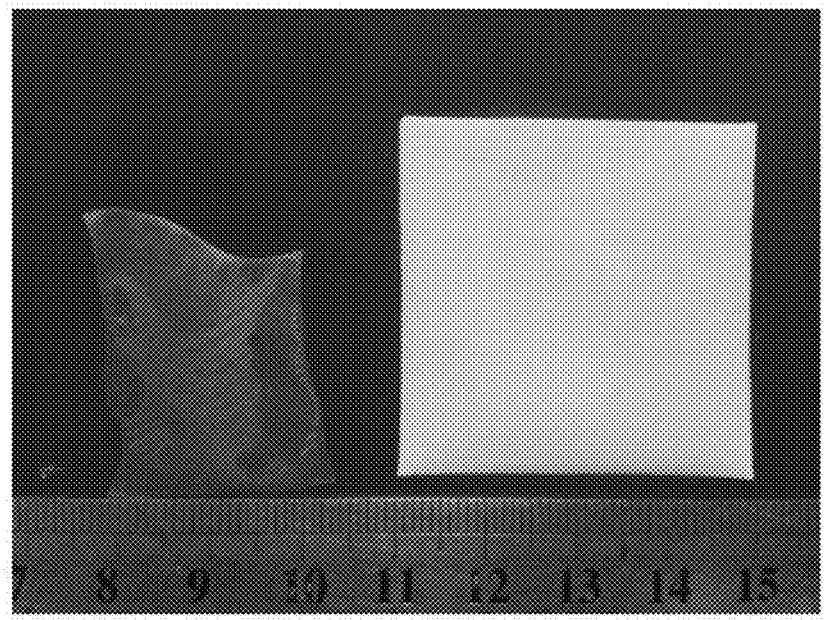
FIG. 13 illustrates thermal shrinkage performance of the polymer modified ceramic composite separator of embodiment 13 and the polyolefin separator after being held at 140° C. for half of an hour (left: the polyethylene separator, right: the polymer modified ceramic composite separator of embodiment 13).

FIG. 13 shows thermal shrinkage comparison between the polyolefin separator and the polymer modified ceramic composite separator after being held at 13° C. for half of an hour, wherein the left one is the polyolefin separator and the right one is the the polymer modified ceramic composite separator.

Embodiment 14

1 g of a mixture consisting of titanium oxide nanoparticles, gelatin and polyvinyl alcohol (PVA) in mass ratio of 80:8:12 is added into 25 mL of a mixed solution of deionized water and ethanol (3:1, v:v). The resulting ceramic slurry is milled overnight and ultrasonically dispersed for 50 minutes as preparation for coating. Polyamide (PI) separator is used as support layer for fabricating ceramic-coated separator. The resulting slurry was uniformly coated on one side or double sides of a polyamide (PI) separator, preheated with a hot plate at 60° C., and dried under a vacuum oven at 60° C. overnight to completely remove the solvent after most of the solvent volatilized to obtain a ceramic-coated separator.

1 g of acrylonitrile (AN) is added into 30 mL of a mixture solvent of nitrogen-methylpyrrolidone and acetone (10:1, V:V) and stirred mechanically for 25 hours to prepare a monomer solution for fabricating polyacrylonitrile modified ceramic composite separator. The ceramic-coated separator is immersed in the monomer solution and after reacting in standing at 50° C. for 10 h, a polyacrylonitrile modified ceramic composite separator is obtained. The polyacrylonitrile modified ceramic composite separator is preheated with a hot plate at 60° C., and dried under a vacuum oven at 60° C. overnight to completely remove the solvent after most of the solvent volatilized.

Embodiment 15

1 g of a mixture consisting of copper oxide particles, carboxyl methyl cellulose (CMC) and styrene-butadiene rubber (SBR) in mass ratio of 75:10:15 is added into 30 mL of a mixed solution of deionized water and ethanol (3:1, v:v). The resulting ceramic slurry is milled overnight and ultrasonically dispersed for 60 minutes as preparation for coating. Polyvinyl chloride (PVC) separator is used as support layer for fabricating ceramic-coated separator. The resulting slurry was uniformly coated on one side or double sides of a polyvinyl chloride (PVC) separator, preheated with a hot plate at 60° C., and dried under a vacuum oven at 60° C. overnight to completely remove the solvent after most of the solvent volatilized to obtain a ceramic-coated separator.

1 g of ethylene oxide (EO) is added into 10 mL of a mixture solvent of nitrogen-methylpyrrolidone and acetone (1:1, V:V) and stirred mechanically for 5 hours to prepare a monomer solution for fabricating polyethylene oxide modified ceramic composite separator. The ceramic-coated separator is immersed in the monomer solution and after reacting in standing at 50° C. for 10 h, a polyethylene oxide modified ceramic composite separator is obtained. The polyethylene oxide modified ceramic composite separator is preheated with a hot plate at 60° C., and dried under a vacuum oven at 60° C. overnight to completely remove the solvent after most of the solvent volatilized.

Comparative Embodiment 2

A battery comprises an anode material, a cathode material and a commercialized separator deposed between the cathode material and the anode material.

Embodiment 16

Figure 14:
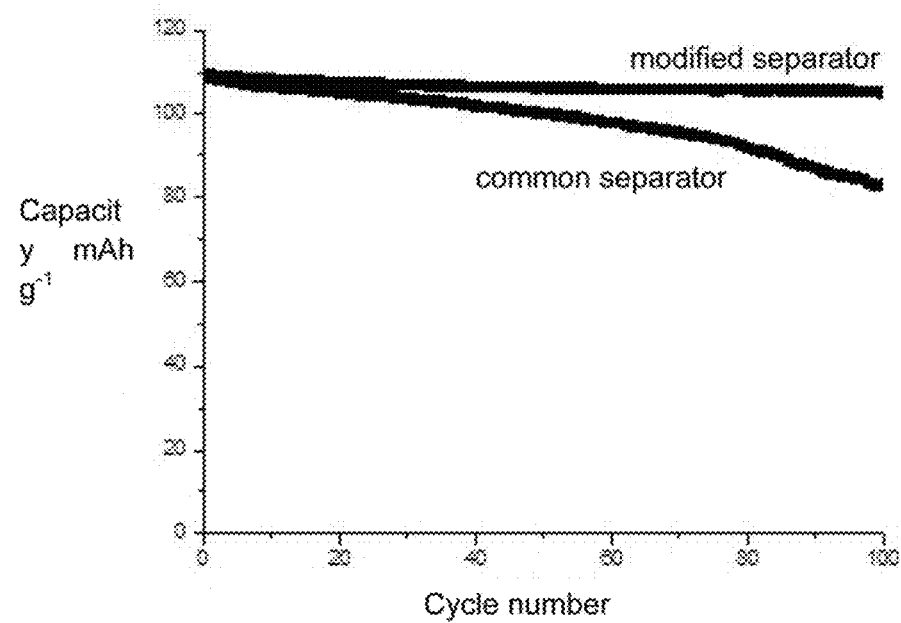
FIG. 14 illustrates cycle performances of the battery with the polymwe modified ceramic composite separator of embodiment 11 and the common separator of comparative embodiment 1.

A battery comprises an anode material, a cathode material and a polymer modified ceramic composite separator of embodiment 1 deposed between the cathode material and the anode material. FIG. 14 shows cycle performances of the battery of embodiment 6 and comparative embodiment 1. It can be seen that the cycle performance of the battery with the dopamine modified ceramic composite separator of present invention is significantly improved over the battery with the separator of prior art.

Embodiment 17

A battery comprises an anode material, a cathode material and a dopamine modified ceramic composite separator of embodiment 2 deposed between the cathode material and the anode material.

Embodiment 18

A battery comprises an anode material, a cathode material and a dopamine modified ceramic composite separator of embodiment 3 deposed between the cathode material and the anode material.

Embodiment 19

A battery comprises an anode material, a cathode material and a dopamine modified ceramic composite separator of embodiment 4 deposed between the cathode material and the anode material.

Embodiment 20

A battery comprises an anode material, a cathode material and a dopamine modified ceramic composite separator of embodiment 5 deposed between the cathode material and the anode material.

Those skilled in the art can know that the specific technical parameters and components of the present invention can still achieve the same or similar technical effects as those of the above embodiments when they are changed within the following ranges:

A modified ceramic composite separator of present invention comprises a ceramic-coated separator which comprising an organic support layer and a ceramic layer coated on the surface of the support layer in a thickness of 0.1 μm to 20 μm (preferably 0.5 μm to 5 μm), further comprises a polymer grown in-situ on the surface and interior of the support layer and the ceramic layer. The polymer is polymethylmethacrylate, polyvinylidene fluoride-hexafluoropropylene, polyacrylonitrile, polyimide, polyetheramide, polyoxyethane or polyoxyethylene. The method of in-situ growth comprising the steps of immersing the ceramic-coated separator in a monomer solution of the polymer and reacting for 5 to 40 hours at 10 to 70° C., wherein the solvent of the monomer solution is a mixture of water and an organic solvent or a mixture of a strong polar solvent and a poor polar solvent, the volume ratio of water to the organic solvent and the volume ratio of the strong polar solvent to the poor polar solvent is 2~3:0~1 respectively, an inorganic power in the ceramic layer has a particle size of 5 nm to 10 μm, and the material of the organic support layer has a molecular weight of 1000-100000000.

The material of the organic support layer comprises at least one selected from the group consisting of polyolefin porous polymer, polytetrafluoroethylene, polyvinylidene fluoride, polyethylene, polyvinyl chloride, poly-m-phenylene isophthalamide resin, polyethylene terephthalate, polyvinylidene fluoride-hexafluoropropylene copolymer, polymethylmethacrylate, polyacrylonitrile, polyimide, polyvinylpyrrolidone, polyethylene oxide, polyvinyl alcohol and a blending, copolymerization system derived from above polymers.

The inorganic power is at least one selected from the group consisting of $Al_2O_3$, $TiO_2$, $SiO_2$, $ZrO_2$, $SnO_2$, MgO, ZnO, $BaSO_4$, BN, AlN and $Mg_3N_2$.

INDUSTRIAL APPLICABILITY

The modified ceramic composite separator of present invention comprises polymer grown in-situ on the surface and interior of the support layer and the ceramic layer, which can effectively reduce the come-off of powder of the ceramic layer and liquid leakage, and increase the interface stability between electrolytes and electrodes.

The foregoing descriptions are merely exemplary embodiments of the present invention, and therefore should not be taken as limiting the scope of the present invention, that is, equivalent variations and modifications made according to the scope of the present invention and the contents of the specification should all be covered by the present invention in the range.

What is claimed is:

1. A modified ceramic composite separator, comprising:
   a ceramic-coated separator, and
   a polymer, wherein:
      the ceramic-coated separator comprises an organic support layer and a ceramic layer coated on at least one surface of the organic support layer,
      a thickness of the ceramic layer is 0.1 μm to 20 μm,
      a porosity of the ceramic layer is larger than a porosity of the organic support layer,
      the polymer is grown in-situ on a surface and interior portions of the organic support layer and a surface and interior portions of the ceramic layer,
      the polymer comprises a dopamine polymer,
      the dopamine polymer comprises a copolymer of a monomer M and dopamine acrylamide, and
      the monomer M comprises at least one of methyl methacrylate, ethyl methacrylate, butyl methacrylate, isobutyl methacrylate, hydroxyethyl methacrylate, ethylene glycol methyl methacrylate, polyethylene glycol dimethacrylate, methyl 3-methoxyacrylate, methyl acrylate, ethyl acrylate, lauryl methacrylate, trifluoroethyl acrylate, glycidyl methacrylate, 2-methyl-2-acrylic-2-ethyl-2-[[(2-methyl-1-oxy-2-propenyl) oxy] methyl]-1,3-propanediyl ester, trimethylsilyl methacrylate, triethylene glycol dimethacrylate, 1,1,1,3,3,3-hexakis fluoroisopropyl acrylate, trifluoroethyl acrylate, tetraethylene glycol diacrylate, 2,2,3,3-tetrafluoropropyl methacrylate, tetrahydrofurfuryl acrylate, or 2-(2-ethoxyethoxy) ethyl acrylate.

2. A lithium-ion battery comprising the modified ceramic composite separator according to claim 1.

3. A lithium-ion battery, comprising:
an anode material, and
a cathode material, wherein:
the modified ceramic composite separator according to claim 1 is disposed between the cathode material and the anode material.

4. A method for manufacturing a modified ceramic composite separator, the modified ceramic composite separator comprising:
a ceramic-coated separator, and
a polymer, wherein:
the ceramic-coated separator comprises an organic support layer and a ceramic layer coated on at least one surface of the organic support layer,
a thickness of the ceramic layer is 0.1 μm to 20 μm,
a porosity of the ceramic layer is larger than a porosity of the organic support layer,
the polymer is grown in-situ on a surface and interior portions of the organic support layer and a surface and interior portions of the ceramic layer,
the polymer comprises a dopamine polymer,
the dopamine polymer comprises a copolymer of a monomer M and dopamine acrylamide, and
the monomer M comprises at least one of methyl methacrylate, ethyl methacrylate, butyl methacrylate, isobutyl methacrylate, hydroxyethyl methacrylate, ethylene glycol methyl methacrylate, polyethylene glycol dimethacrylate, methyl 3-methoxyacrylate, methyl acrylate, ethyl acrylate, lauryl methacrylate, trifluoroethyl acrylate, glycidyl methacrylate, 2-methyl-2-acrylic-2-ethyl-2-[[(2-methyl-1-oxy-2-propenyl) oxy] methyl]-1,3-propanediyl ester, trimethylsilyl methacrylate, triethylene glycol dimethacrylate, 1,1,1,3,3,3-hexakis fluoroisopropyl acrylate, trifluoroethyl acrylate, tetraethylene glycol diacrylate, 2,2,3,3-tetrafluoropropyl methacrylate, tetrahydrofurfuryl acrylate, or 2-(2-ethoxyethoxy) ethyl acrylate, and
the method of in-situ growth comprises:
immersing the ceramic-coated separator in an alkaline solution of the monomer M, and
reacting for 5 to 40 hours at 10 to 70° C., wherein:
a solvent of the alkaline solution is a mixture of water and an organic solvent,
a volume ratio of the water to the organic solvent is 2-3:0-1,
an average particle size of inorganic powders in the ceramic layer is 5 nm to 10 μm, and
a molecular weight of a material of the organic support layer is 1000 to 100000000.

5. The method for manufacturing the modified ceramic composite separator according to claim 4, wherein:
the material of the organic support layer comprises at least one of polyolefin porous polymer, polytetrafluoroethylene, polyvinylidene fluoride, polyethylene, polyvinyl chloride, poly-m-phenylene isophthalamide resin, polyethylene terephthalate, polyvinylidene fluoride-hexafluoropropylene copolymer, polymethylmethacrylate, polyacrylonitrile, polyimide, polyvinylpyrrolidone, polyethylene oxide, polyvinyl alcohol, a polymer blend system thereof, or a copolymerization system derived thereof.

6. The method for manufacturing the modified ceramic composite separator according to claim 4, wherein the inorganic powders comprise at least one of $Al_2O_3$, $TiO_2$, $SiO_2$, $ZrO_2$, $SnO_2$, MgO, ZnO, $BaSO_4$, BN, AlN, or $Mg_3N_2$.

7. The method for manufacturing the modified ceramic composite separator according to claim 4, wherein the thickness of the ceramic layer is 0.5 μm to 5 μm.

8. The method for manufacturing the modified ceramic composite separator according to claim 4, wherein the molecular weight of the material of the organic support layer is 100000 to 1000000.

* * * * *